United States Patent [19]

Mercier et al.

[11] Patent Number: 5,172,726

[45] Date of Patent: Dec. 22, 1992

[54] PRESSURE REGULATOR

[75] Inventors: Claude Mercier, St-Genis-Pouilly; Jean Livet, Geneva; Raphael Prina, Perly, both of Switzerland

[73] Assignee: Honeywell Lucifer S.A., Carouge/Geneve, Switzerland

[21] Appl. No.: 727,242

[22] Filed: Jul. 9, 1991

[51] Int. Cl.$^5$ ............................................. F15B 13/043
[52] U.S. Cl. ............................ 137/625.64; 137/625.6
[58] Field of Search ............ 137/625.6, 625.61, 625.64

[56] References Cited

U.S. PATENT DOCUMENTS

| | | |
|---|---|---|
| 3,225,557 | 12/1965 | Miller . |
| 3,265,089 | 8/1966 | Nill ............................ 137/625.64 X |
| 4,506,700 | 3/1985 | Kramer . |
| 4,527,592 | 7/1985 | Dotti et al. ................ 137/625.64 X |
| 4,531,708 | 7/1985 | Livet ........................... 251/129.15 X |
| 4,585,030 | 4/1986 | Fox .............................. 137/625.61 X |
| 4,590,968 | 5/1986 | Wolfges ....................... 137/625.64 |
| 4,617,968 | 10/1986 | Hendrixon ................... 137/625.64 |
| 4,655,249 | 4/1987 | Livet ............................ 137/625.65 X |
| 4,966,195 | 10/1990 | McCabe ...................... 137/625.64 X |

FOREIGN PATENT DOCUMENTS

| | | |
|---|---|---|
| 0195890 | 10/1986 | European Pat. Off. . |
| 0247336 | 12/1987 | European Pat. Off. . |
| 3836754 | 5/1989 | Fed. Rep. of Germany ....................... 137/625.64 |
| 1400877 | 4/1965 | France . |
| 261782 | 11/1987 | Japan ............................. 137/625.64 |
| 1072988 | 6/1967 | United Kingdom . |

*Primary Examiner*—Gerald A. Michalsky
*Attorney, Agent, or Firm*—Young & Thompson

[57] ABSTRACT

The pressure regulator comprises a valve with a slide member (5) whose displacements are controlled by the pressure prevailing in the control chamber (7). This pressure is adjusted by an obturator (11) of tubular shape which, in its upper position, places the chamber (7) in communication with the opening (4) of the fluid outlet. The fluid is admitted into the valve by an opening (2) and the displacements of slide member (5) permit adjusting the pressure in the opening (3) which supplies a user. The control chamber (7) is fed from the opening (3) through a conduit (20) with fluid whose pressure is already adjusted.

4 Claims, 1 Drawing Sheet

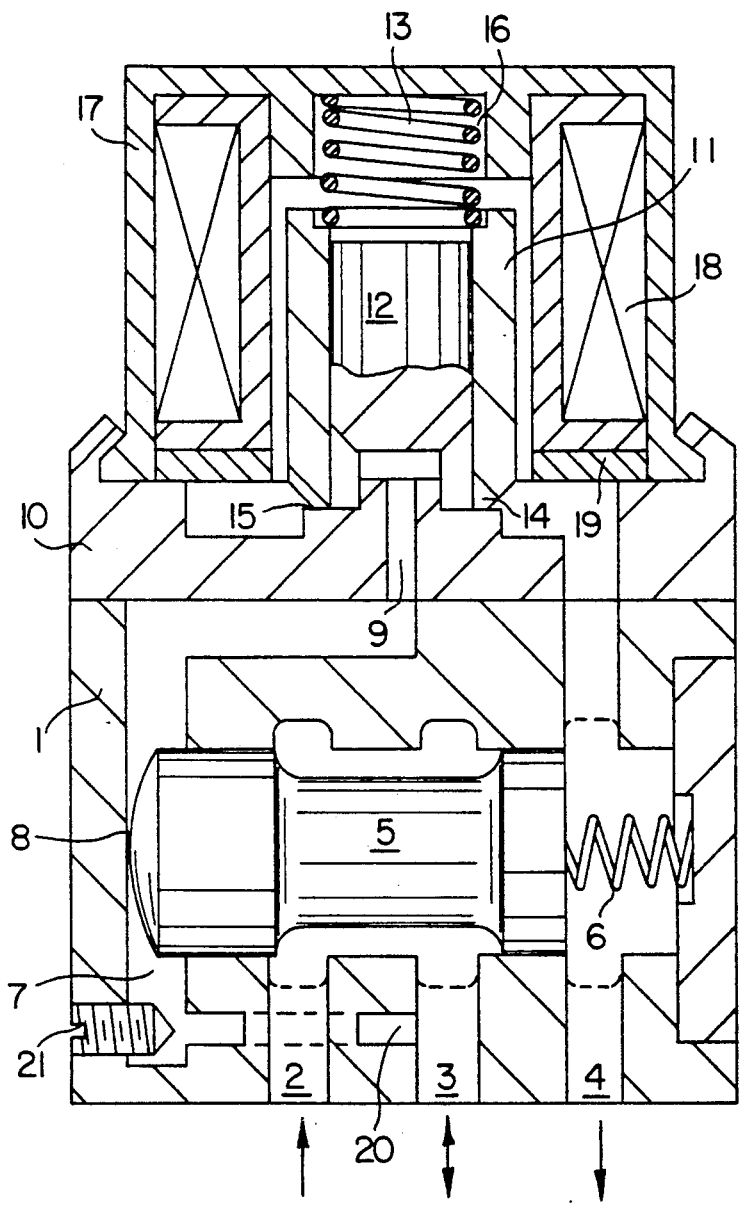

PRESSURE REGULATOR

There are already regulators comprising a three passage valve, electrically controlled, comprising a body with three openings for the inlet and respectively the outlet of a fluid to be controlled, at least one valve member coacting with these openings to effect as desired the communication between an opening corresponding to a user device and one or the other of the two openings adapted to be connected respectively to a source of fluid under pressure and to a receiver, this valve member being controlled by the pressure of a fluid in a control chamber acting on a movable member and against the force of a return spring, the pressure of the fluid in the control chamber being controlled by a magnetic core subjected to the action of a return spring and to the action of a magnetic field produced by an excitation winding.

The invention has for its object to improve the precision of adjustment of the pressure of the fluid. To this end, the regulator is characterized in that the control chamber communicates on the one hand with the discharge by a passageway controlled by said magnetic core and on the other hand with the opening adapted to be connected to the user device, this latter communication providing a passageway of smaller section than that of the passageway controlled by the magnetic core.

The single figure of the accompanying drawing shows, schematically and by way of example, an embodiment of the valve comprising the device according to the invention, this valve being seen in cross section.

As shown in the drawing, the valve has three passageways and comprises a body 1 with three openings 2, 3 and 4. Opening 2 is provided for the inlet of a fluid under pressure which need not necessarily be constant. The opening 3 is adapted to be connected to a user device (not shown), which could be for example a control jack for a mechanical member. Opening 4 is provided for outlet of the fluid, either to a discharge, or to a recovery return, according to the nature of the fluid.

The communication between the openings 2 and 3 and respectively 3 and 4 is controlled by a slide member 5 pressed toward the left by a return spring 6 or toward the right by the pressure of the fluid prevailing in a control chamber 7, this pressure acting on the end surface 8 of slide member 5.

The control chamber 7 can be discharged through a conduit 9 provided in a cover 10 of body 1, this discharge being controlled by an obturator member 11 in the form of a hollow cylinder sliding practically without play on a cylindrical portion 12. This obturator member 11, of ferromagnetic material, is subjected to the action of a spring 13 to press its lower annular edge 14 against a seat 15, which prevents communication of the conduit 9 with opening 4 for return of the fluid. The upper end of spring 13 bears against the bottom of a recess 16 provided in a cap of ferromagnetic material 17 secured on cover 10.

Cap 17 contains an electric winding 18 which, when it is traversed by an excitation current, produces a magnetic field passing through the external wall of the cap, the upper surface of this latter, the obturator member 12, and returns via a ferromagnetic ring 19. The magnetic attraction exerted on the obturator member 11 raises this latter against the action of spring 13 and spaces it from seat 15, thereby opening the communication between the conduit 9 and the orifice 4 for outlet of the fluid.

Entry of the fluid into the control chamber 7 is via orifice 3 through a conduit 20 which opens in the chamber 7 opposite a screw needle 21 permitting adjustment as desired of the section of the inlet passage into the chamber 7. This section should be smaller than the maximum opening section between the obturator member 11 and it seat 15.

The pressure regulator comprises as will be understood a pressure measuring device (not shown), such as a manometric sensor providing an electric signal indicating the pressure acting on the user fed by the orifice 3. This electric signal acts on an electronic unit (not shown) which supplies to the winding 18 the current necessary to move the obturator member 11 to obtain the pressure desired at the outlet of orifice 3. The valve shown is very well adapted to control by a current of impulses of variable duration, because the low inertia of the obturator member 11 permits it to follow the current control impulses of the winding 18, thereby giving instantaneous and precise adjustment of the pressure on the user side.

Thanks to the fact that the control chamber 7 is fed with a fluid at the stabilized pressure obtaining in the opening 3, the control of the slide member 5 is easy and stable, even if the feed pressure in the opening 2 has substantial variations.

Finally, it will be clear that the device can be adapted for the control of gaseous or liquid fluid.

We claim:

1. In a pressure regulator comprising a valve with three passages, electrically controlled, comprising a body with three openings for the inlet and outlet respectively of a fluid to be controlled, at least one obturator coacting with these openings to obtain as desired communication between an opening corresponding to a user device and one or the other of the two openings adapted to be connected respectively to a source of fluid under pressure and to a discharge, this obturator being controlled by the pressure of a fluid in a control chamber acting on a movable member and against the force of a return spring, the pressure of the fluid in the control chamber being controlled by a magnetic core subjected to the action of a return spring and to the action of a magnetic field produced by an excitation winding, the control chamber communicating on the one hand with the discharge through a passage controlled by said magnetic core and on the other hand with the opening adapted to be connected to the user device, this latter communication having a passageway of cross section smaller than that of the passage controlled by the magnetic core; the improvement wherein the magnetic core is in the form of a hollow cylinder that slides on a fixed cylindrical portion, said passage communicating between the control chamber and the interior of the cylindrical magnetic core through a portion of said passage that is disposed within said fixed cylindrical portion.

2. Device according to claim 1, characterized in that the obturator is constituted by a slide member sliding in said body.

3. Device according to claim 1, characterized in that the passageway of smaller cross section is adjustable by means of an adjustable needle.

4. Device according to claim 1, wherein said passage opens through a side wall portion of said fixed cylindrical portion adjacent one end of said fixed cylindrical portion.

* * * * *